May 31, 1966  F. W. SCHNEIDER  3,253,699
CONVEYOR CONSTRUCTION
Filed Sept. 6, 1963
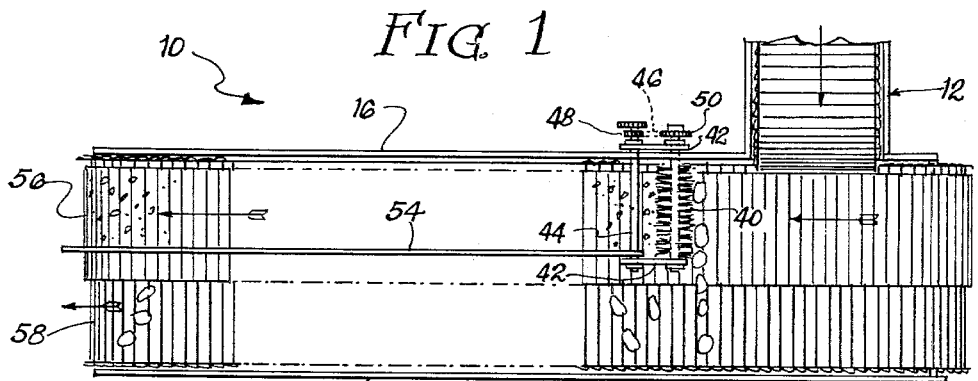
FIG. 1
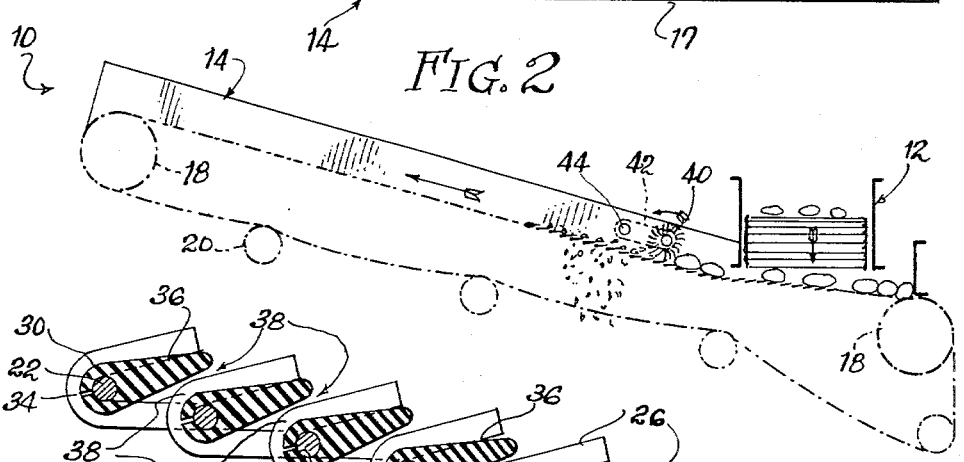
FIG. 2
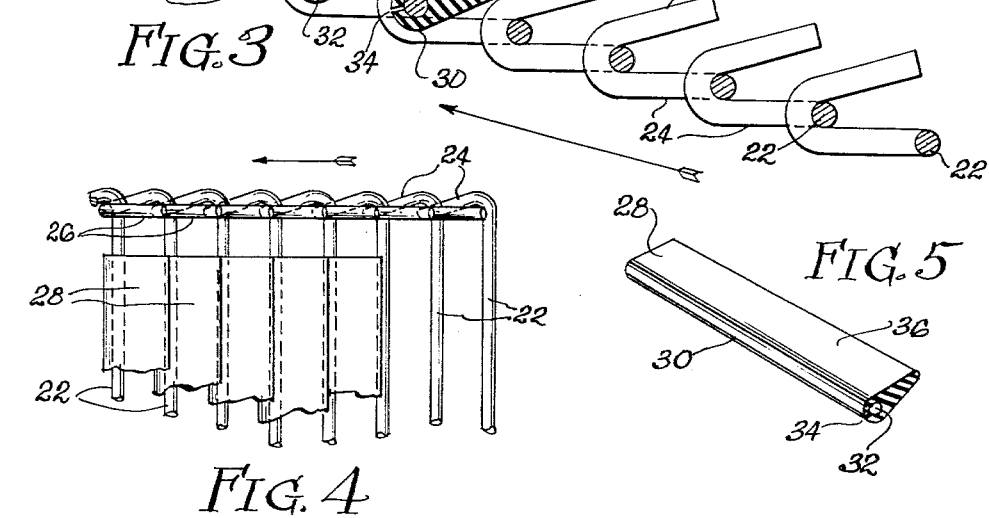
FIG. 3
FIG. 4
FIG. 5
INVENTOR.
Fred W. Schneider
BY Ooms, McDougall & Hersh
Att'ys

United States Patent Office 3,253,699
Patented May 31, 1966

3,253,699
CONVEYOR CONSTRUCTION
Fred W. Schneider, Michigan City, Ind., assignor to Champion Corporation, Hammond, Ind., a corporation of Indiana
Filed Sept. 6, 1963, Ser. No. 307,078
4 Claims. (Cl. 198—195)

This invention relates to an improved design for a conveyor construction. Although the invention is not limited thereto, the conveyor construction is particularly suitable for use in harvesters wherein produce must be transferred from one section of a harvester to another.

A typical example of such a harvester is a potato harvester wherein the potatoes along with dirt, rocks, vines and the like are removed from the ground by the harvester and then handled by the harvester until the potatoes are separated from the unwanted material and delivered to a recovery station of the harvester. Conveyor constructions designed for use in such harvesters advantageously include means for efficiently separating the unwanted material from the produce to be recovered.

It is well-known that various forms of harvesters, such as potato diggers have been devised. Initially such diggers were horse drawn and included means for removing the produce, dirt, etc., and for shaking the dirt from the produce on a conveying or shaking chain. More recently, tractors have been employed for driving the harvesters, and a power take-off has been provided for delivering power to the conveying sections.

In many cases, it has become necessary to separate rocks, stones and relatively large clods of dirt from the produce, and it has been found that conventional harvester designs were not entirely suitable for such purposes. However, in the Krukowski Patent No. 2,901,048, issued August 25, 1959, there is described a harvester construction which is uniquely suitable for carrying out the desired separation of produce such as potatoes from other materials dug up in the course of the harvester operation.

It is an object of this invention to provide an improved design for a conveyor mechanism which provides great improvements in the operation of a harvester or the like.

It is a more particular object of this invention to provide an improved conveyor construction which is particularly suitable for use in a potato harvester of the type described in the aforementioned Krukowski patent.

These and other objects of this invention will appear hereinafter, and for purposes of illustration, but not of limitation, specific embodiments of this invention are shown in the accompanying drawing in which:

FIGURE 1 is a schematic plan view illustrating contemplated application for the conveyor construction of this invention;

FIGURE 2 is a schematic elevational view of the operation illustrated in FIGURE 1;

FIGURE 3 is an enlarged detailed view, partly in section, illustrating the details of the members forming the conveyor bed;

FIGURE 4 is a fragmentary plan view of the members of the conveyor construction; and, FIGURE 5 is a perspective view of a resilent member employed in the construction of this invention.

The conveyor construction of this invention generally comprises a plurality of substantially parallel spaced-apart bars which are interconnected whereby the bars can be moved together in a predetermined path. Resilient means are secured to each of the bars and these resilient means include portions which extend across the spaces between the bars. With this arrangement, the interconnected bars are capable of defining, at least in part, a continuous conveyor surface.

The resilient means specifically employed in accordance with this invention comprise base portions which at least partially encircle the bars making up the conveyor. A split can be provided in the resilient means whereby they can be removably attached to the bars. However, the use of resilient means permanently molded about the bars is contemplated. An outwardly extending portion is integrally formed with respect to the base portion of the resilient members whereby overlapping of the resilient members in the conveyor assembly is provided. It will be appreciated that the overlapping arrangement will enable the presentation of a substantially continuous surface; however, since the resilient members are not connected to each other, spaces can be provided therebetween to facilitate discharge of unwanted material from the conveyor.

The construction of this invention has found particular utility in a potato harvester construction of the type described in the aforementioned patent. The following description will refer to this particular application of the conveyor construction; however, other uses for this conveyor design will be obvious.

In a potato harvester, the potatoes are dug up from the ground and passed onto conveyors in the harvester. The digging operation necessarily provides for passage of dirt, rocks, vines and the like onto the harvester, and one function of the harvester is to provide for separation of the potatoes from this unwanted material.

In accordance with the present invention, a conveyor construction is provided which is uniquely suitable for separating the potatoes from the unwanted material. Specifically, the resilient members above referred to are only provided along one side of the supporting bars whereby a continuous conveyor surface will be provided on this one side while the other side of the system is characterized by a plurality of relatively wide spaces defined between the parallel bars. With this arrangement, the more or less continuous side of the conveyor can be employed for carrying the relatively large clumps of dirt, rocks and vines to a discharge area while the other side of the conveyor can be adapted for carrying the potatoes to a discharge area. In this manner, small pieces of dirt and rocks as well as undersized potatoes will be removed from the conveyor even if this unwanted material is passed with the potatoes to this other side of the conveyor.

The invention also contemplates a construction wherein the resilient members extend completely along the supporting bars whereby a substantially continuous conveyor surface is defined all across the conveyor. Furthermore, the resilient members may have their outwardly extending portions directed in either direction. In some cases, reversal of the resilient members from the direction illustrated in the accompanying drawings will provide means for facilitating movement of articles up the conveyor.

In order to facilitate separation of the potatoes from the unwanted material, a rotary brush means is preferably employed in combination with the unique conveyor design of this invention. This brush means is adapted to be spaced from the resilient members on the one side of the conveyor whereby materials such as dirt, rocks and vines can pass by the brush means while the brush means will be effective to hold potatoes from movement along the conveyor whereby the potatoes will tend to collect on the other side of the conveyor which does not include the resilient members. The brush means are preferably mounted for pivotal movement whereby large dense objects, such as large rocks, will force their way by the brush means whereas the less dense potatoes will not be able to force their way along with the unwanted material.

A further feature of the instant invention relates to the ability of the resilient means to eliminate bruising of the potatoes during the harvester operation. In this connection, the resilient members act as buffers for the potatoes when they drop from one level of the harvester onto a conveyor employing the resilient members. The overlapping and slightly spaced-apart arrangement of these resilient members materially improves this characteristic of the system since the resilient means present a substantially continuous surface and can also "give" when hit by potatoes.

A more detailed description of the invention is provided by the illustrations in the accompanying drawings. FIGURE 1 illustrates a portion 10 of a potato harvester wherein a first conveyor portion 12 is adapted to deliver potatoes and other material to a second conveyor portion 14. As illustrated, the conveyor portion 12 is located at a higher level than the portion 14 so that the materials transported are dropped onto the conveyor portion 14.

The conveyor portion 14 includes side frame members 16 and 17, and these members provide supports for the elements of the conveyor. As shown in FIGURE 2, the conveyor is of the endless type which is adapted to be carried by drive and guide rollers 18 and 20, respectively. The conveyor illustrated is advantageously tilted downwardly away from the edge adjacent the conveyor 12. With this arrangement, there is a greater tendency for the material on the conveyor to collect on that portion of the conveyor which does not include the resilient members.

The conveyor elements include bars 22 which have bent-back ends 24, these ends, including return portions 26. As best shown in FIGURE 3, return portion 26 engages the horizontal portion of an adjacent bar whereby the bars are linked together to form an endless construction.

Resilient members 28 are removably secured on one side of each of the bars 22. These members include a base portion 30 which defines a bore 32 dimensioned to receive the horizontal portion of a bar. A split 34 can be formed in each of the resilient members whereby these members can be pressed onto the bars and also removed therefrom in a relatively simple manner. The resilient members are also characterized by an extending portion 36 which tapers toward a relatively narrow end. As best illustrated in FIGURE 3, the resilient members are attached to the bars in a manner such that the extending portions 36 overlap the base portions 30. It will, therefore, be apparent that a relatively continuous upper surface will be presented by that portion of the construction which includes the resilient members. It will be noted, however, that these members are positioned on the bars whereby spaces 38 are defined between the extending portions and the base portion of adjacent members. With this arrangement, small pieces of dirt and other unwanted material is adapted to pass between the resilient members whereas potatoes carried on the members will be in no danger of dropping through. It is also to be noted that the positioning of the members 28 is such that the upper surface thereof is adapted to be maintained horizontal or even sloped slightly toward the discharge end. Accordingly, effective transport of material on this side of the conveyor can be accomplished even though the conveyor path is upward.

Although the resilient members are illustrated with tapered ends, it will be understood that other designs for these resilient members can be employed. The members may be uniform in thickness all along the lengths or the extending portions thereof may be of a greater thickness than the base portions. Certain applications may require variations in the design of these members.

Mounted over the resilient members in the conveyor 14 is a rotary brush 40. This brush is journalled in an arm 42 which is pivotally connected on the transverse bar 44. A drive chain 46 interconnects the gears 48 and 50 whereby rotary movement of the brush can be effected. The mounting for the rotary brush is also preferably designed whereby the brush can pivot about a vertical axis. With this arrangement, and with the axis located near the bar 44, the brush will offer even less resistance to heavy objects such as large rocks moving up the conveyor. Furthermore, there will be a still greater tendency for the brush to push the potatoes or other articles to the other side of the conveyor.

In a typical operation, material comprising potatoes, dirt, rocks, vines and the like will be dropped from the conveyor 12 onto the conveyor 14. It will be noted that due to the disposition of the resilient members 28, a cushion for the potatoes will be provided by the conveyor 14. The spacing between the extending portion 36 and the base portion 30 contributes to this cushioning effect, while the resilient character of the members 28 also aids in decreasing a tendency toward bruising of the potatoes. In this connection, the members 28 can be formed of a durable natural or synthetic rubber or of materials of a similar nature.

The conveyor 14 will tend to move all of the material up the incline on the side of the conveyor provided with the resilient members 28. This material will thus encounter the rotary brush 40 which is adapted to rotate in a counterclockwise direction. Accordingly, the lower peripheral portion of the brush 40 will oppose the direction of movement of the conveyor thereby tending to sweep larger articles back down the conveyor. The tilt of the conveyor described above will also aid in encouraging this movement. Smaller pieces of dirt, rocks and the like will pass between the brush and the conveyor while large pieces of high density will tend to force the conveyor to pivot in a clockwise direction about the bar 44. Such high density material will, therefore, also pass beyond the brush 40. It will be noted that a divider 54 is provided rearwardly of the brush 40 whereby the unwanted material will not be displaced onto the other side of the conveyor but will move to the discharge end 56.

The potatoes will tend to collect onto an opposite side of the conveyor which does not include the resilient members. In this case, potatoes of a desired size will be carried up the conveyor and will discharge at 58. The spacing of the bars 22 is maintained whereby none of the potatoes to be harvested will pass between the bars. On the other hand, any unwanted material which may have passed to this side of the conveyor and which is of sufficiently small size, will pass between the bars. It has been found that the efficiency of removal of unwanted material is extremely high when the system of this invention is compared to more conventional systems.

It will be understood that various changes and modifications may be made in the construction described above which provide the characteristics of this invention without departing from the spirit thereof particularly as defined in the following claims.

That which is claimed is:

1. In a conveyor construction, a plurality of elongated, substantially parallel, spaced-apart bars, means interconnecting said bars at the ends thereof to permit movement of the bars in a predetermined path with the lengths of the respective bars defining the width of the conveyor bed, and resilient means attached to each of said bars, said resilient means extending partially along the length of each bar at one side of the conveyor bed with a substantial portion of said lengths without said resilient means forming the other side of said conveyor bed, the resilient means on each bar including a portion extending in a perpendicular direction towards an adjacent bar whereby a substantially continuous conveyor surface is defined along said one side of the conveyor bed while said other side of the conveyor bed is characterized by a plurality of openings defined between adjacent bars, and wherein said resilient means comprise a base portion encircling said bars with a split formed in said base portion whereby said resilient means can be releasably secured on said bars, and wherein said portion extending towards an adjacent bar comprises a tapered portion overlapping the base portion of an adjacent resilient means.

2. A construction in accordance with claim 1 wherein said bars include link means defined in their ends whereby they can be linked together to form a continuous belt.

3. In a harvester for use in the harvesting of produce wherein dirt, rocks, vines and the like are uncovered along with the produce, the improvement comprising a conveyor construction mounted on the harvester and adapted to transfer the produce from one location of the harvester to another, said construction including a plurality of substantially parallel, spaced-apart bars, means interconnecting said bars at the ends thereof to permit movement of the bars in a predetermined path with the lengths of the respective bars defining the width of the conveyor bed, and resilient means attached to each of said bars, said resilient means extending partially along the length of each bar along one side of the conveyor bed with a substantial portion of said lengths without said resilient means forming the other side of said conveyor bed, the resilient means on each bar including a portion extending in a direction towards an adjacent bar whereby a substantially continuous conveyor surface is defined along said one side of said conveyor bed while the other side of said conveyor bed is characterized by a plurality of openings defined between adjacent bars, said resilient means comprising a base portion encircling said bars, and wherein said portion extending towards an adjacent bar comprises a tapered portion overlapping the base portion of an adjacent resilient means.

4. A harvester in accordance with claim 3 wherein said bars include link means defined in their ends whereby they can be linked together to form a continuous belt.

References Cited by the Examiner

UNITED STATES PATENTS

| 481,645 | 8/1892 | Wibong | 171—25 |
|---|---|---|---|
| 861,484 | 6/1907 | Stewart | 198—195 |
| 958,164 | 5/1910 | Parker | 209—91 |
| 2,136,363 | 11/1938 | Hume | 198—195 |
| 2,149,776 | 3/1939 | Knoerzer | 198—195 |
| 2,244,827 | 6/1941 | Crawford | 198—195 |
| 2,964,181 | 12/1960 | Demarest | 209—91 |

FOREIGN PATENTS 527,057  7/1956  Canada.

OTHER REFERENCES

German printed application 1,150,921, June 1963.

SAMUEL F. COLEMAN, *Primary Examiner.*

ERNEST A. FALLER, RICHARD E. AEGERTER,
*Examiners.*